United States Patent [19]

Corse

[11] 4,103,595
[45] Aug. 1, 1978

[54] CUTTING MACHINES FOR CUTTING UP A WEB OF MATERIAL SUCH AS PAPER OR CARDBOARD

[75] Inventor: Louis Gaston Corse, Chaumont sur Tharonne, France

[73] Assignee: Machines Chambon, Chaumont sur Tharonne, France

[21] Appl. No.: 819,000

[22] Filed: Jul. 26, 1977

[30] Foreign Application Priority Data

Aug. 5, 1976 [FR] France .............................. 76 23914

[51] Int. Cl.$^2$ .............................................. B31B 1/14
[52] U.S. Cl. ...................................... 93/58.3; 83/103; 83/303; 93/36 A; 93/58.4
[58] Field of Search ................ 93/36 A, 58.3, 58.2 R, 93/58.4, 33 R, 1 G; 83/300, 303, 479

[56] References Cited

U.S. PATENT DOCUMENTS

| | | | |
|---|---|---|---|
| 2,425,041 | 8/1947 | Luehrs | 93/58.3 |
| 2,588,581 | 3/1952 | Sieger | 83/303 |
| 2,776,607 | 1/1956 | Fisher et al. | 93/58.3 X |
| 2,998,760 | 9/1961 | Allen | 93/58.3 |
| 3,173,346 | 3/1967 | Zerhov et al. | 93/58.3 |
| 3,795,164 | 5/1974 | Scheider | 93/58.2 R |
| 3,844,201 | 10/1974 | Eggert | 93/58.3 X |
| 3,903,774 | 10/1976 | Seragnoli | 83/303 X |
| 4,041,819 | 8/1977 | Chu et al. | 93/58.2 A X |

Primary Examiner—Leon Gilden
Attorney, Agent, or Firm—McAulay, Fields, Fisher & Goldstein

[57] ABSTRACT

A machine for cutting up a web of material comprises a flat cutting press and, downstream thereof, either a rotary cutting apparatus or a rotary peeling apparatus. Then two apparatuses are interchangeable depending upon the type of cutting operation to be used. A unit for receiving cut material is provided downstream of whichever of the two apparatuses is used.

9 Claims, 1 Drawing Figure

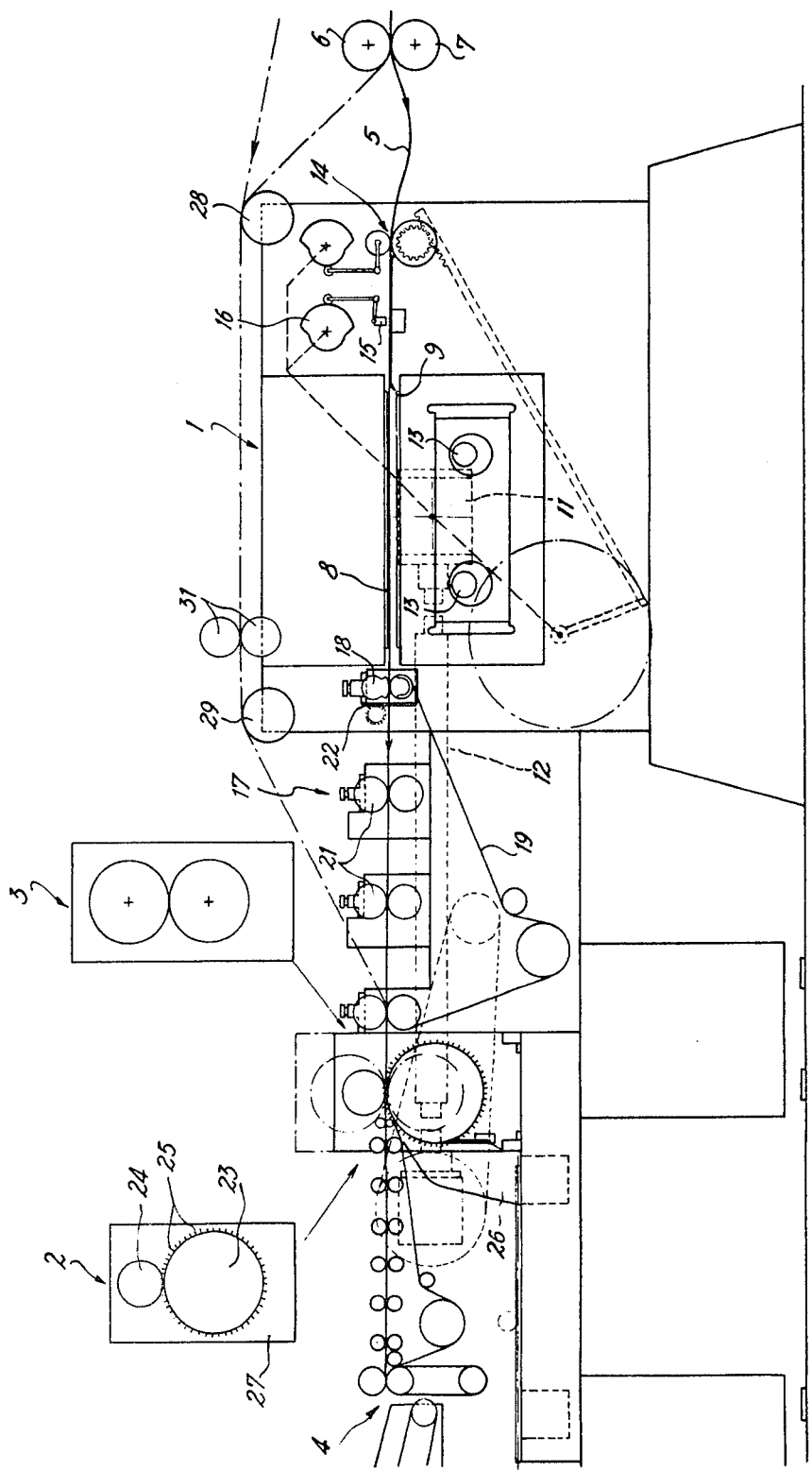

4,103,595

CUTTING MACHINES FOR CUTTING UP A WEB OF MATERIAL SUCH AS PAPER OR CARDBOARD

BACKGROUND OF THE INVENTION

This invention relates to a machine for cutting up a web of material such as paper or cardboard.

A machine for applying printed matter to a web is generally equipped, at its outlet end, with finishing apparatus using two types of cutting up systems, namely rotary cutting or flat cutting.

A rotary cutting apparatus comprises a cutting cylinder carrying cutting or fold-forming blades, and a co-operating cylinder. The blades of the cutting cylinder are either cut from the material of the cylinder or secured to it. Consequently, rotary cutting tools are costly and so are used for cutting operations carried out in long runs since they also enable high speeds to be achieved.

In a rotary cutting machine, the scrap resulting from the cutting up of the web of material is removed in the machine itself by means of barbed spikes carried by the lower co-operating cylinder. Apparatus of this kind operates on a continuously moving web, which is fed by means of the printing presses and tensioning apparatus downstream of the presses.

A flat cutting machine comprises a flat wooden board carrying cutting or folding blades and a co-operating part which is like wise flat. One of the parts of a flat cutting machine, namely the bed or co-operating part, is vertically displacable and is applied to the other part, when the movement of the web is stationary for carrying out the cutting operation. The cost of the tools of such a flat cutting apparatus is not great, and the apparatus is mainly used for cutting up short runs. However, the speed of the apparatus is limited by the need for advancing the web on an intermittent basis.

In a flat cutting apparatus, the scrap in excess of the cut shapes is not always removed in the apparatus itself, and it is then necessary to provide, downstream of the cutting apparatus, what is known as a peeling apparatus for removing this scrap.

Hitherto, therefore, separate machines have been designed, one for rotary cutting in the case of long runs, and one for flat cutting for dealing with short runs. However, it has been found advantageous to have available a single machine which, while being economical to produce and operate, is equally suitable for cutting up operations in long runs and short runs.

The main aim of the present invention is to provide such a machine which is of particularly simple construction and lends itself in a notable manner for use under all conditions.

SUMMARY OF THE INVENTION

For this purpose, the present invention provides a machine for cutting up a web of material, the machine comprising in combination, a flat cutting press followed by a rotary cutting or peeling apparatus depending upon the type of cutting operation used, these apparatuses being interchangeable in the machine, and a unit for receiving cut material emerging from the rotary cutting or peeling apparatus that is used.

In the case of cutting in a short run, the web of material to be cut up passes in turn through the flat cutting press and the rotary peeling apparatus which receives the cut material in sheet form and which, in the same manner as in a standard rotary cutting apparatus, removes the scrap attached at points to the cut material. The cut material, from which the scrap has been removed, is then passed to a receiving unit identical to that generally provided downstream of a rotary cutting apparatus, for example, a receiving unit comprising belts.

When a long run of material has to be cut up, the peeling apparatus is replaced by a rotary cutting apparatus, and the flat cutting press is "short-circuited" by causing the web that is to be cut up to pass either above or below this press so as to introduce it directly into the rotary cutting apparatus.

In this machine, the rotary peeling and cutting apparatuses are designed to be rapidly interchangeable by mechanical means. They occupy the same space, and the same control system is used and means are provided for fitting and removing them rapidly.

BRIEF DESCRIPTION OF THE DRAWING

One form of machine for cutting up a web or material and constructed in accordance with the invention will now be described, by way of example, with reference to the accompanying drawing, the single FIGURE of which is a diagrammatic side elevation of the machine.

DESCRIPTION OF PREFERRED EMBODIMENT

Referring to the drawing, a cutting machine consists mainly of a first apparatus constituted by a flat cutting press 1, of a second apparatus which may be a rotary peeling apparatus 2 or a rotary cutting apparatus 3, and finally of a unit 4 for receiving the cut material. The web 5 of material that is to be cut up is introduced into the machine from a pair of feed and tensioning rollers 6 and 7 which rotate at a constant speed. These rollers, 6 and 7 can be arranged at the outlet end of a machine (not shown) that has applied printed matter to the web 5.

Depending upon the length of the run of cut material to be formed, the web 5 is either introduced into the flat cutting press 1 along the path indicated by the solid line, or it by-passes this cutting press either above it, as indicated by the dash-dot line, or below it.

When short runs of material have to be cut up, use is made of the flat cutting press 1 which may be any one of the known types. This cutting press comprises a cutting plate 8, which is fixed in the example illustrated (but which could be movable) and with which co-operates a lower part 9 which is vertically movable so that it can be periodically applied to the cutting plate 8 to carry out the flat-cutting operation. The vertical movement of the co-operating part 9 is accomplished by means of a main electric motor 11 which drives a main operating shaft 12 which in turn drives the co-operating part 9 by way of transverse shafts carrying eccentrics 13. The web 5 is preferably fed intermittently into the cutting press 1 by means of an intermittent feed mechanism designated generally by the reference numeral 14. During cutting up, the web 5 is immobilised by a clamp 15 which is actuated by a cam 16 which is caused to rotate by the shaft 12.

The cutting plate 8, which consists of a wooden board with cutting blades partly embedded therein, can be moved towards the front of the cutting press 1 to enable it to be rapidly changed in dependence upon the type of work to be carried out. Between the rotary peeling apparatus 2 (or the rotary cutting apparatus 3) and the flat-cutting press 1, is located a transfer apparatus 17 which is used to extract cut material coming from the flat-cutting press and to transfer the material to the continuous peeling apparatus 2 when the latter is used. The transfer apparatus 17 comprises a set of embossed rollers 18, located at the outlet from the flat cutting press 1, a set of conveyor belts 19, and one or more sets of transfer rollers 21.

The set of embossed rollers 18 is used to detach the portion of the web 5 that has just been cut from the rest of the web and which therefore forms a cut sheet and for synchronising the forward movement of this portion with the speed of revolution of the cylinders of the peeling apparatus 2.

The setting of the embossed rollers 18 comprises two operations:

1. Setting to determine the moment at which the portion of the web 5 that has been cut off is seized. Depending upon the type of cut and the strength of the web 5, the moment at which the offcut is seized and separated from the rest of the web lies between two limits:
   (a) Seizing during movement: in this case the sheet is seized at the moment when its speed is the same as that of the rotary peeling apparatus 2. The advantage of this is that the impact caused is low since there are no great variations of speed. However, this suffers from the disadvantage that the knife that makes the final cut is located at the inlet of the cutting platen and this knife must leave attachment points to enable the web to push the cut sheet into the zone of the transfer apparatus 17. Once the sheet has been seized by the embossed rollers 18, the web is not in position in the flat-cutting press 1 and it has still to cover a certain distance which involves the risk of inaccurate positioning in the cutting press.
   (b) Seizing during stoppage: in this case the sheet is seized at the moment when its movement is arrested and the lower co-operating part 9 of the cutting press 1 is at its top neutral position. In this case, there is no need for any attachment points at the position where the knife that makes the final cut is situated, this knife being located at the outlet from the platen, the cut sheet being then completely separated from the web. However, this seizing operation suffers from the disadvantage that the arrested sheet may be suddenly accelerated up to the peeling speed and this applies an impact to it thus giving rise to the risk of, for example, tearing and inaccurate positioning.

The ideal is therefore to find a position between the two above-mentioned extremes. This position can be adjusted, during operation, by means of differential gearing which alters the rotary angular position of the embossed rollers 18.

2. Adjustment of the level of the embossed rollers 18 to create good conditions for receiving the sheet emerging from the cutting press 1. The level of the sheet in the cutting press 1 can in fact vary in dependence upon the speed of this press or upon the setting of the embossed rollers 18. Then, during operation, it is possible to adjust the level of the embossed rollers 18 with the aid of a rack 22 which causes the vertical position of the embossed rollers 18 to be varied.

The set of conveyor belts 19 of the transfer apparatus 17 supports each cut sheet during transfer between the embossed rollers 18, the pick-up rollers 21 and the peeling apparatus 2. The speed of the belts 19 is selected to be slightly greater than that of the cut sheets so as to ensure that the latter are tensioned during transfer so as to maintain the synchronism.

The sets of pick-up or transfer rollers 21, the positions of which are adjustable so as to adjust the pick-up of the sheet to be cut in dependence upon the formats of the cut material and the positioning of the embossed rollers 18, are used to maintain the synchronisation of the speed of the cut sheets during their transfer to the peeling apparatus 2. Movement is imparted to them and to the embossed rollers 18 by a chain (not shown) so as to synchronise the speed with that of the peeling apparatus 2.

At the outlet from the transfer apparatus 17, the cut sheets produced by the flat-cutting press 1 are introduced into the rotary peeling apparatus 2 which is shown in solid lines in a position that is occupied in the machine as a whole when it is in fact used. This rotary peeling apparatus 2 comprises a main lower cylinder 23 and a secondary upper cylinder 24, these two cylinders being formed by grooved discs which are individually adjustable. The lower cylinder 23 carries barbed peeling spikes 25 which operate like harpoons to remove the scrap. These spikes 25 enter the grooves in the upper cylinder 24. Combs (not illustrated) then clear the scrap picked up by the spikes 25 and carry it to an underlying discharge chute 26 where it is removed by a suction system.

The peeling apparatus 2 also comprises a frame 27 on which the cylinders 23 and 24 are supported and rotate, the frame being readily fitted in a portion of the machine-stand as a whole. The cylinders 23 and 24 of the rotary peeling apparatus 2 are also rigidly connected to shafts and pinions (not shown) which may be readily coupled to the main operating shaft 12 of the machine.

The peeling apparatus 2 may be positioned, during operation, by means of a differential gear (not shown) and may be displaced along the width of the machine by means of lateral adjusting screws (not shown) which displace the apparatus.

The peeling apparatus 2 is followed by a conventional reception unit 4 comprising rollers for singling the cut sheets and means for arranging them in small stacks.

Thus, when a short run of material is to be cut up, the web 5 passes through the flat-cutting press 1 where it is parted off to form separate cut sheets which are picked up and conveyed by the transfer apparatus 17 to the peeling apparatus 2. The latter removes scrap from the cut sheet which, when thus trimmed, pass into the reception unit 4.

When it is required to cut up a long run of material the peeling apparatus 2 is removed from the machine and is replaced by the rotary cutting apparatus 3 which is of similar dimensions. This apparatus 3 is locked in position in the machine stand, and the web 5 is then caused to by-pass the cutting press 1, for example, to move above this press, by causing the web to move over guide rollers 28 and 29, mounted in the upper portion of the stand of the cutting press 1 and optionally through a pair of tensioning rollers 31. The web 5 is then introduced directly into the rotary cutting apparatus 3 by-passing the pick-up rollers 21 of the transfer apparatus 17. In this case the rotary cutting apparatus 3 itself eliminates the scrap resulting from the cutting operation. This scrap being evacuated through the chute 26 as in the previous case. The reception unit 4 therefore receives cut sheets which are in the same condition as those obtained by flat cutting.

I claim:

1. A machine for cutting up a web of material, the machine comprising three units arranged along the path of movement of the web through the machine, the first unit being a flat cutting press, the second unit being a rotary peeling apparatus, and the third unit being a reception unit for cut sheets of web material, a fourth unit being provided as a replacement for the second unit, the fourth unit being a rotary cutting apparatus, wherein means are provided for by-passing the first unit when the fourth unit replaces the second unit.

2. A machine as claimed in claim 1, wherein the second and fourth units are housed in frames of the same longitudinal and transverse dimensions whereby each may be releasably fixed in the same position within the machine.

3. A machine for cutting up a web of material, the machine comprising three units arranged along the path of movement of the web through the machine, the first unit being a flat cutting press, the second unit being a rotary, web-processing unit and the third unit being a reception unit for cut sheets of web material, wherein means are provided for directing the web alternatively through the first, second and third units or through the second and third units.

4. A machine as claimed in claim 3, further including a transfer mechanism between the first and second units for feeding the web from the outlet of the first unit to the inlet of the second unit.

5. A machine as claimed in claim 4, wherein the transfer mechanism comprises a set of embossed rollers, arranged at the outlet of the first unit, at least one set of pick-up rollers, and at least one conveyor belt.

6. A machine as claimed in claim 3, wherein the means for directing the web through the second and third units is constituted by guide rollers and/or tensioning rollers.

7. A machine as claimed in claim 6, wherein the guide rollers and/or tensioning rollers are positioned above the first unit so as to guide the web directly to the second unit.

8. A machine as claimed in claim 3, wherein the second unit is a rotary peeling apparatus, in which case the web is arranged to pass successively through all three units.

9. A machine as claimed in claim 3, wherein the second unit is a rotary cutting apparatus, in which case the web is arranged to pass through only the second and third units.

* * * * *